United States Patent [19]

Johnson

[11] 4,261,749

[45] Apr. 14, 1981

[54] THERMOPLASTIC INKS SUITABLE FOR PRESSURE RELEASE-TYPE DECALCOMANIA

[75] Inventor: Ronald E. Johnson, Tioga, Pa.

[73] Assignee: Corning Glass Works, Corning, N.Y.

[21] Appl. No.: 74,909

[22] Filed: Sep. 13, 1979

[51] Int. Cl.³ .............................................. C09D 11/00
[52] U.S. Cl. ....................................... 106/23; 106/22; 106/31; 260/13; 260/23 R; 260/28 R; 260/28.5 R; 260/28.5 A; 260/37 AL
[58] Field of Search ............................ 106/31, 22, 23; 260/28 R, 28.5 A, 28.5 R, 37 AL, 13, 23 R

[56] References Cited

U.S. PATENT DOCUMENTS

| | | | |
|---|---|---|---|
| 3,993,492 | 11/1976 | Woolly | 106/19 |
| 4,014,833 | 3/1977 | Story | 106/31 |

*Primary Examiner*—Melvyn I. Marquis
*Attorney, Agent, or Firm*—Clinton S. Janes, Jr.

[57] ABSTRACT

The present invention is drawn to the production of thermoplastic inks exhibiting pressure sensitivity at temperatures substantially below their softening points, consisting essentially, in weight percent, of:
  (a) about 50–80% of a pigmented, vitreous, inorganic flux;
  (b) about 5–25% of a polyethylene glycol having a molecular weight greater than 200 but less than 950;
  (c) about 2–20% of a water soluble, cohesive strength imparting polymer having a molecular weight between about 25,000–50,000 selected from the group of polyvinyl pyrrolidone and a water soluble cellulosic ether; and
  (d) 0–20% of a modifying wax and/or plasticizer.

8 Claims, No Drawings

4,261,749

THERMOPLASTIC INKS SUITABLE FOR PRESSURE RELEASE-TYPE DECALCOMANIA

BACKGROUND OF THE INVENTION

Thermoplastic (hot melt) inks for decorating vitreous, glass-ceramic, and ceramic ware are articles of commerce. Compositions therefor have been numerous with the majority thereof exhibiting wax-like characteristics with low melt viscosities, typically less than about 150 poises at their application temperatures, and tack-free surfaces when cooled to a significant extent below the softening points thereof. The inks or pastes used in decorating and/or printing have generally consisted of a vitrifiable, inorganic material or flux containing a suitable inorganic pigment or colorant and an organic, flowable vehicle or binder in which the pigment is dispersed. These pigment-containing flux materials have been utilized for many years for decorating glass and ceramic ware and are marketed by ceramic color manufacturers as complete vitrifiable or ceramic colors. These materials are dispersed in a vehicle or medium as desired by the user.

Inks suitable for decorating glass, glass-ceramic, or ceramic surfaces are typically filled with from about 60-90% by weight total of glass fluxes, inorganic pigments, and inorganic opacifiers. Such inks, after application, are fired at elevated temperatures (in excess of $\sim 500°$ C.) to burn out the organic constituents and melt the glass flux. Accordingly, the organic constituents must be capable of being burned off at relatively low temperatures such that they are removable without adversely affecting the visual appearance and permanence of the decoration. Materials useful therefor have included waxes such as fatty alcohols, polyethylene glycol, polyethylene glycol esters, etc., fortified with a cohesive strength imparting resin or viscosity modifier such as ethyl cellulose, hydroxypropyl cellulose, butyl methacrylate, etc.

The application of thermoplastic inks to various substrates has generally taken the form of screening directly onto a substrate, although other practices, for example, offset screening from an elastomeric surface such as is disclosed in U.S. Pat. No. 3,688,695, have been described. The ink compositions reviewed above have been found satisfactory for use in screening processes but have proven less than fully adequate in other decorating techniques, particularly in those techniques utilizing elastomeric transfer (offset) operations such as offset screening or offset stamping from an intaglio plate. Such a process is described in U.S. Pat. No. 3,756,165. The operating parameters of these offset printing processes were necessarily governed by the properties of the conventional oil-based or solvent-based decorating inks. Such inks must be permitted to dry to a tacky, semi-solid state upon the elastomer surface following which they can be transferred as an integral film to a substrate. The glass fluxes and pigments exert a pronounced effect upon the viscosity of the organic vehicle or medium. Consequently, relatively high levels of organic solvents must be employed as carriers, which solvents should display reasonably high rates of volatilization so as not to unduly limit process speeds and/or saturate the surface of the elastomer. On the other hand, solvents demonstrating high rates of evaporation have given rise to viscosity stability problems of such severity that undesirably slow process speeds have been reluctantly accepted. This situation is disclosed in U.S. Pat. No. 3,756,165.

It is apparent that thermoplastic inks could alleviate this viscosity problem. Unfortunately, however, the formulations customarily employed in screening operations were less than satisfactory for transfer (offset) printing because of a lack of pressure sensitivity at temperatures much below their softening points. Stated in other words, the inks required heating to temperatures closely approximating their softening points during transfer or required transfer to an adhesive-coated substrate. This circumstance is explained in U.S. Pat. No. 3,688,695.

Another means for decorating glass, glass-ceramic, and ceramic ware which has been utilized extensively involves decalcomania transfers (decals). Three principal types have been used in commerce: the water release-type, the heat release-type, and the pressure release- or cold release-type.

As the name indicates, the first type requires soaking the decal with water to effect separation of the backing from the design. The design is temporarily adhered to the substrate, the substrate thoroughly dried, and then fired at a sufficiently high temperature to fuse the design into the surface thereof.

The heat release-type decal comprises a heat releasable backing at the face of the vitreous design layer and an outermost thermoplastic or heat activatable adhesive surface at the opposite or rear side of the vitreous design. The thermoplastic side of the decal is pressed against the surface of a preheated substrate whereby the heat from the substrate softens the adhesive surface sufficiently to cause the design to be temporarily attached to the substrate. In a second action occurring concurrently, the heat from the substrate softens the heat releasable backing, thereby effecting release of the backing from the design. The substrate is subsequently fired in the normal manner to fuse the design into the surface thereof.

The pressure release-type decalcomania can have a structure similar to that of the heat release-type except that the heat release layer is replaced with a silicone release layer. Moreover, the adhesive layer overlay must exhibit room temperature pressure sensitivity, thereby removing any need for heating the substrate. The adhesive layer manifests a preferential adherence to the substrate rather than the silicone release layer, which enables release of the decal to be achieved by simply pressing the decal against the ware to be decorated.

The term "thermoplastic," as discussed in the context of this adhesive layer, must be distinguished from the expression as utilized above in relation to thermoplastic inks. Under both sets of circumstances, the materials reversibly soften upon the application of heat, thus giving rise to the term "thermoplastic." When employed in the context of inks, however, the expression also implies melt processibility or application; whereas the material suitable for the decal adhesive layer is simply applied from solution over the vitreous design. Therefore, to remove possible ambiguity in the expression "thermoplastic," melt processible inks have been referred to as "hot melt inks" or merely "hot color;" whereas the solution-applied adhesive overlay has frequently been designated as a "lacquer."

U.S. application Ser. No. 74,907, pending filed concurrently herewith by the present applicant, discloses a number of thermoplastic ink formulations suitable for use in heat release-type and pressure release-type decals. That specification also provides a more detailed description of the construction of heat release-type and pressure release-type decalcomania and reference is hereby made to that description. The inks disclosed therein consist generally of:

(a) a vitrifiable, inorganic flux optionally containing inorganic pigments;
(b) an ethylene-ester copolymer resin having a copolymerized ester selected from the group of vinyl alcohol esters of $C_1$–$C_4$ saturated monocarboxylic acids and $C_1$–$C_5$ saturated alcohol esters of acrylic or methacrylic acid;
(c) an amorphous tackifying resin;
(d) an organic wax and/or plasticizer; and, optionally,
(e) a modifying polyolefin resin.

OBJECTIVES OF THE INVENTION

The principal objective of the subject invention is to provide thermoplastic inks, suitable for decorating vitreous, glass-ceramic, and ceramic articles, which manifest such pressure sensitivity and extraordinarily low affinity for silicone surfaces that they can be transferred from higher surface energy silicone compositions than is possible with other types of thermoplastic inks, these qualities recommending their use in those offset processes utilizing multiple consecutive silicone surfaces for ink transfer and in the preparation of pressure release-type decalcomania on silicone-coated paper via flexographic or offset processes.

Another objective of this invention is to provide thermoplastic inks, suitable for decorating vitreous, glass-ceramic, and ceramic articles, which demonstrate permanent pressure sensitivity at room temperature, thereby permitting their transfer from elastomeric or silicone-coated surfaces either immediately or after extended storage.

SUMMARY OF THE INVENTION

Polyethylene glycols have been employed as components of commercial glass and ceramic decorating media. Because these compounds demonstrate excellent firing characteristics, they have found extensive use as thermoplastic screening media, as the wax release layer in heat release-type ceramic decals, and as plasticizers in aqueous or organic solvent-based media. The polyethylene glycols utilized in both applications of thermoplastic screening media and for the wax release layer have generally comprised waxes with a molecular weight greater than 950 and going up to about 20,000. These waxes have also frequently included such modifying additives as plasticizers, fillers, pigments, and cohesive strength imparting resins, as well as numerous other adjuvants. Polyethylene glycols having molecular weights less than 950 are liquids at room temperature (or slightly above) and, consequently, have found little application in glass and ceramic decorating inks except as plasticizers for polar resins utilized in aqueous and organic solvent-based media.

The present invention originated in the finding that polyethylene glycols with molecular weights greater than 200 and less than 950 can be blended with ceramic colors, i.e., glass fluxes with inorganic opacifiers and pigments, and certain polar polymers to yield ink compositions having a combination of properties capable of satisfying the above objectives of the invention. Other polyoxyalkylene ethers, such as polypropylene glycol and methoxypolyethylene glycol, are equally operable in this invention provided they have an average molecular weight within a 200–10,000 interval and a softening (melt) point less than about 35° C. The resultant inks are ultra-high viscosity, tacky pastes at room temperature, such as to be unsuitable for heat release-type decals, but are eminently suitable for pressure release-type decalcomania. The inventive formulations are especially useful for application via offset processes wherein a silicone elastomer transfers the decoration from a heated gravure or screen surface to a ware surface. The operable polyoxyaklylene ethers exhibit such extraordinary low affinity for silicone surfaces that the inventive inks can be released from such surfaces at much lower cohesive strengths and over a much broader range of silicone compositions than is possible with other types of pressure sensitive thermoplastic inks.

The inventive inks also make possible the formulation of operable compositions exhibiting R&B (Ring and Ball) softening points below room temperature (~25° C.), but those formulations are generally of such high viscosity that heating is required to achieve processable viscosities. Consequently, in the practical sense, such formulations can still be considered "thermoplastic" or "hot melt" inks.

A discussion of the advantages inherent in the use of thermoplastic inks for decorating glass, glass-ceramic, and ceramic ware and, particularly, the advantage which the property of pressure sensitivity endows to thermoplastic inks when employed in offset decorating processes is provided in Ser. No. 74,907, pending in group supra. The present inventive ink formulations possess the capability of releasing from silicone surfaces having higher surface energies than is possible with the ink composition disclosed in Ser. No. 74,907 pending in group. This advantage is especially significant in the type of offset process which utilizes a collector silicone surface upon which a multi-color print is formed by transfer from other silicone surfaces followed by a single step transfer of the completed multi-color decoration to the ware. This situation appertains both for the process wherein transfer to the ware immediately follows formation of the multi-color print, and for the process wherein the collector consists of a silicone-coated paper and the multi-color print constitutes a decalcomania. In both practices, it is highly desirable to have as great a difference in surface energy as possible between the two silicone surfaces in order to facilitate ink release from one to the other. Moreover, since it has been found that the surface energy of the silicone surface increases with repeated release cycles, the ability to release from higher energy surfaces leads to a longer printing life of the silicone-ink system. Therefore, the inventive materials can result in less frequent replacement of the silicone rolls or pads than is required for other presently-available thermoplastic ink formulations.

The inventive ink formulations offer other practical advantages over prior pressure-sensitive thermoplastic inks for glass and ceramic decorations. The water solubility of the polyoxyalkylene ethers and the polar resins forming a component of the inventive compositions precludes any requirement for the use of organic solvents, even in such operations as cleanup and ware reclaim. Consequently, the health and safety concerns over the exposure of personnel to organic solvents are entirely absent.

Inks operable in the present invention are prepared from formulations consisting essentially of:

(a) about 50–80% by weight of a vitrifiable, inorganic flux containing up to about 40% by weight inorganic pigments and opacifiers;

(b) about 5–25% by weight of a polyoxyalkylene ether having a molecular weight greater than 200 but less than 10,000;

(c) about 2–20% by weight of a water soluble, cohesive strength imparting polymer having a molecular weight between about 25,000–500,000; and, optionally, (d) up to 20% by weight of a modifying wax and/or plasticizer selected from the group consisting of a polyoxyalkylene ether wax having a softening (melt) point between about 35°–65° C. and a molecular weight between about 1000–25,000 and a compatible ester having a softening (melt) point below about 65° C.

When properly formulated, the ink will manifest a viscosity at 200° F. (~93° C.) of about 150–600 poises, as determined with a 100 rpm Brookfield thermocel. The vitrifiable fluxes with inorganic opacifiers and pigments suitable for the inventive products are materials of commerce with can be purchased from ceramic color manufacturers. Most preferably, those materials will be available in an average particle size less than 20 microns. Inasmuch as the transfer temperature of the formulated ink must exceed the softening point of the polyoxyalkylene ether, the softening point of the latter will be less than 95° F. (35° C.) and, desirably, below 77° F. (25° C.). The preferred cohesive strength imparting polymer is polyvinyl pyrrolidone although other water soluble polymers such as hydroxypropyl cellulose may be utilized in some applications. The purpose of the modifying wax and/or plasticizer is to adjust the tack and/or viscosity of the formulated ink, as well as to raise the R&B softening point of the ink. It will be appreciated that the wax and/or plasticizer employed must be compatible with the polyoxyalkylene ether and the cohesive strength imparting polymer, must have a low softening point, i.e., less than about 149° F. (65° C.), and must demonstrate good burnout characteristics. Operable ester waxes include glycerides, fatty acid and fatty alcohol esters, dicarboxylic esters, polyol esters, and polyalkylene glycol esters. A preferred ester wax is an acetylated monoglyceride. Other modifying additives frequently used in the adhesives, ink, and glass decorating industries, such as dispersants, anti-oxidants, and defoamers (and which are compatible with the remainder of the above ink formulation) may optionally be included at a maximum total weight concentration of 5% without deleteriously affecting the basic properties of the inventive products.

DESCRIPTION OF THE PREFERRED EMBODIMENTS

The table below reports several formulations in parts by weight of inks illustrating the characteristics desired. The pigmented glass flux materials were premilled with a dispersant in an alcoholic solvent to an average particle size smaller than about 20 microns. The organic constituents were heated sufficiently to gain a molten state and the flux component blended therewith, the mixing being continued until the alcoholic solvent was evaporated away and a homogeneous mixture secured. The R&B softening point of each formulation is also recorded. M.W. represents the molecular weight of the cited compound.

TABLE

|  | 1 | 2 | 3 | 4 |
|---|---|---|---|---|
| Pigmented Glass Flux | 300 | 240 | 300 | 270 |
| Polyvinyl Pyrrolidone (M.W. 40,000) | 40 | 60 | 40 | 40 |
| Acetylated Monoglyceride Wax (Myvacet 5-07)* | 40 | — | — | 40 |
| Polyethylene Glycol (M.W. 400) | 40 | 60 | 40 | — |
| Polyethylene Glycol Wax (M.W. 1000) | — | — | 40 | — |
| Polypropylene Glycol P400** (M.W. 400) | — | — | — | 40 |
| R&B Softening Point | 39° C. | <25° C. | 44° C. | <25° C. |

*Marketed by Eastman Chemical Products, Inc.
**Marketed by Dow Chemical Co.

Each of the above compositions demonstrates pressure sensitivity in the vicinity of room temperature, i.e., below about 95° F. (35° C.), thereby permitting their transfer from elastomeric or silicone-coated surfaces either immediately or at a later time as, e.g., in the preparation of pressure release-type decalcomania. Therefore, these formulations are equally operable for direct printing and indirect printing.

As used herein, direct printing designates those processes which print a decoration onto ware, whereas indirect printing indicates those processes which apply a decoration onto an intermediate substrate, e.g., decal paper, and thereafter transfer the decoration to ware in a subsequent second operation. These definitions are not accepted universally, however. For example, the expression indirect printing has sometimes been applied to all types of offset processes, and direct printing has been restricted to those operations wherein the printing face contacts the surface of the ware such as takes place in conventional screening, flexographic printing, etc.

The inks of this invention can be used in those direct printing processes which involve an offset elastomeric surface, commonly a silicone rubber, to pick up molten ink from a heated, etched surface or screen, the inks then cooling upon the elastomeric surface to a temperature where they develop adequate tack (pressure sensitivity) to enable their transfer, solely by intimate contact, from the offset surface to a second surface for which the inks have greater affinity. The second surface is customarily an article of glass, glass-ceramic, or ceramic ware, although it can also be paper utilized in pressure release-type decals or a second elastomer, conventionally called a collector, upon which a multi-colored design is built up through successive transfers from several offset elastomers. The completed multi-colored image on the collector elastomer can be transferred to an article of glass, glass-ceramic, or ceramic ware (or to some other surface) by placing the collector into contact therewith. The collector can be a roll, a pad, a thin sheet, or silicone-coated release paper. In this last embodiment, the multi-colored print constitutes a decalcomania.

The following example comprises one illustration of a direct printing process wherein the inventive inks are operable.

EXAMPLE

An intaglio printing plate is heated to between 180°–300° F. (~82°–149° C.) and coated with an inventive ink in the molten state. Excess ink is removed from the plate with a doctor blade or squeegee. The plate is subsequently moved into contact with a silicone offset surface, in this case Dow Corning 3110 silicone, which has the capability of being wetted by the molten ink. The offset surface is then removed from the plate resulting in the liquid ink residing in the recessed design being split between the two surfaces, thereby creating a mirror image of the design on the offset surface. The offset surface is thereafter brought into contact with the surface of ware to be decorated and the ink coating is released as an integral film from the offset surface to the ware surface.

The ink print upon the surface of the ware possesses sufficient integrity to permit a second color or design to be immediately applied thereover and/or in contiguous relation thereto. If desired, this transfer process can be repeated numerous times to achieve a full spectrum of colors. However, experience has shown that, for optimum results, no more than four transfers will be made in superjacent relation.

Where a decalcomania is to be printed rather than the surface of ware, the preferred practice contemplates utilizing flexographic printing or offset rotogravure as the application process. Again, intaglio or inking rolls will be heated to about 180°–300° F., the offset or flexographic rolls being preferably fabricated from a silicone rubber. In the production of pressure release-type decals, a uniform, pin hole-free layer of ink is printed upon the paper prior to applying the design colors. This ink layer may have the same formulation as that of the design layers except that the inorganic filler is solely glass flux, i.e., there are no pigments therein. This clear layer serves the dual function of a sealant to separate the design colors from the release layer and as an overflux for the fired decal to enhance decoration durability.

I claim:

1. A thermoplastic ink suitable for decorating glass, glass-ceramic, and ceramic articles exhibiting pressure sensitivity at temperatures below about 35° C. prepared from a formulation consisting essentially, in weight percent, of:
   (a) about 50–80% of a vitrifiable, inorganic flux containing up to about 40% by weight inorganic pigments and opacifiers;
   (b) about 5–25% by weight of a polyoxyethylene ether having a molecular weight greater than 200 but less than 10,000 and having a softening point less than about 35° C.;
   (c) About 2–20% by weight of a water soluble, cohesive strength imparting polymer having a molecular weight between about 25,000–500,000; and
   (d) 0–20% by weight of a modifying wax and/or plasticizer compatible with said polyoxyethylene ether and said cohesive strength imparting polymer, being selected from the group consisting of a polyoxyethylene ether wax having a softening point between about 35°–65° C. and a molecular weight between 1000–25,000 and an ester wax having a softening (melt) point below about 65° C.

2. A thermoplastic ink according to claim 1 wherein said vitrifiable, inorganic flux is present in particulate form, the particles having diameters less than about 20 microns.

3. A thermoplastic ink according to claim 1 wherein said water soluble polymer is polyvinyl pyrrolidone.

4. A thermoplastic ink according to claim 1 wherein said polyoxyalkylene ether wax is a polyethylene glycol wax.

5. A thermoplastic ink according to claim 1 wherein said ester wax is selected from the group consisting of glycerides, fatty acid and fatty alcohol esters, dicarboxylic esters, polyol esters, and polyalkylene glycol esters.

6. A thermoplastic ink according to claim 5 wherein said glyceride is an acetylated monoglyceride.

7. A thermoplastic ink according to claim 1 wherein said polyoxyalkylene ether is a polyethylene glycol having a molecular weight greater than 200 but less than 950.

8. A thermoplastic ink according to claim 1 wherein said polyoxyalkylene ether is selected from the group consisting of polypropylene glycol and methoxypolyethylene glycol.

* * * * *

UNITED STATES PATENT AND TRADEMARK OFFICE
CERTIFICATE OF CORRECTION

PATENT NO. :   4,261,749
DATED       :   April 14, 1981
INVENTOR(S) :   Ronald E. Johnson It is certified that error appears in the above-identified patent and that said Letters Patent are hereby corrected as shown below:

Column 8, line 4, change "polyoxyethylene" to -- polyoxyalkylene --.

Column 8, line 6, between "softening" and "point", add -- (melt) --.

Column 8, line 12, change "polyoxyethylene" to -- polyoxyalkylene --.

Column 8, lines 15-16, between "softening" and "point", add -- (melt) --.

Signed and Sealed this

Eighth Day of September 1981

[SEAL]

Attest:

GERALD J. MOSSINGHOFF

Attesting Officer    Commissioner of Patents and Trademarks